United States Patent [19]
Whitehouse

[11] 3,727,718
[45] Apr. 17, 1973

[54] SURFACE WAVE AMBIGUITY ANALYZER

[75] Inventor: Harper John Whitehouse, San Diego, Calif.

[73] Assignee: The United States of America as represented by the Secretary of the Navy

[22] Filed: Nov. 24, 1971

[21] Appl. No.: 201,693

[52] U.S. Cl. ................181/.5 AP, 181/.5 R, 333/30, 73/170, 324/80
[51] Int. Cl. .......................H03h 7/30, G01r 23/00
[58] Field of Search..................................333/30, 72; 181/.5 R, .5 AP; 73/170; 324/80

[56] References Cited

UNITED STATES PATENTS 3,582,838   6/1971   DeVries ................................333/30
3,573,673   4/1971   DeVries ................................333/30

Primary Examiner—Benjamin A. Borchelt
Assistant Examiner—J. V. Doramus
Attorney—Richard S. Sciascia et al.

[57] ABSTRACT

A surface-wave ambiguity analyzer comprising a substrate, capable of propagating an acoustic surface wave on its surface, and a transmitting electroacoustic transducer, disposed upon the substrate, having a perimeter substantially in the shape of a trapezoid whose base is parallel to the direction of surface wave propagation. The transmitting transducer comprises a pair of sets of interdigited electrodes, the configuration of the electrodes conforming in shape to the graphs of a set of regular functions which do not cross or otherwise touch each other, a top bus bar, parallel to the base of the trapezoid, to which one of the sets of electrodes is connected, and a bottom bus bar, forming the base of the trapezoid, to which the other set of electrodes of the pair of sets is connected, the top and bottom bus bars being connectable to an electrical signal source. Two absorbers, one on each end of the substrate, are disposed perpendicularly to the base of the trapezoid, for absorbing unwanted acoustic reflections. The ambiguity analyzer may further comprise at least one acousto-electric receiving transducer, disposed at one end of the substrate between the transmitting transducer and one of the absorbers, whose electrodes are disposed perpendicularly to the direction of propagation of the acoustic wave.

9 Claims, 4 Drawing Figures

UNCODED SURFACE WAVE AMBIGUITY ANALYZER.

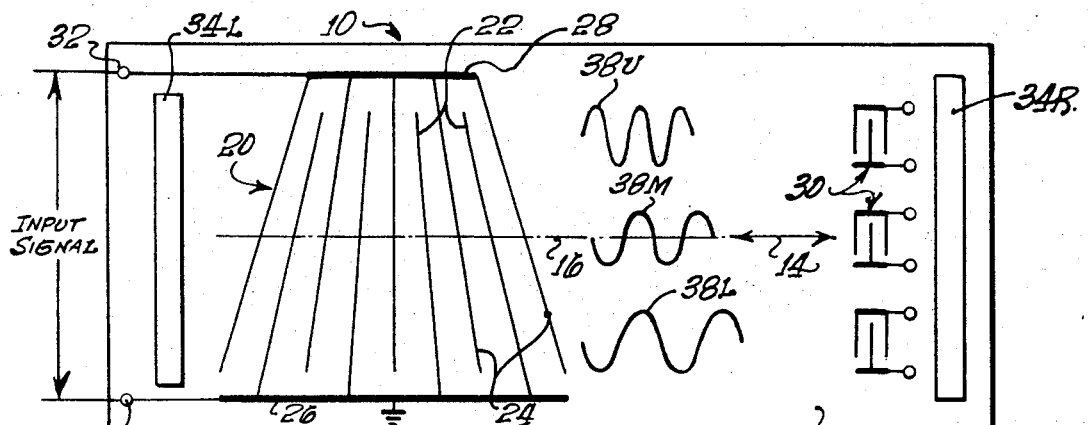
FIG. 1. UNCODED SURFACE WAVE AMBIGUITY ANALYZER.
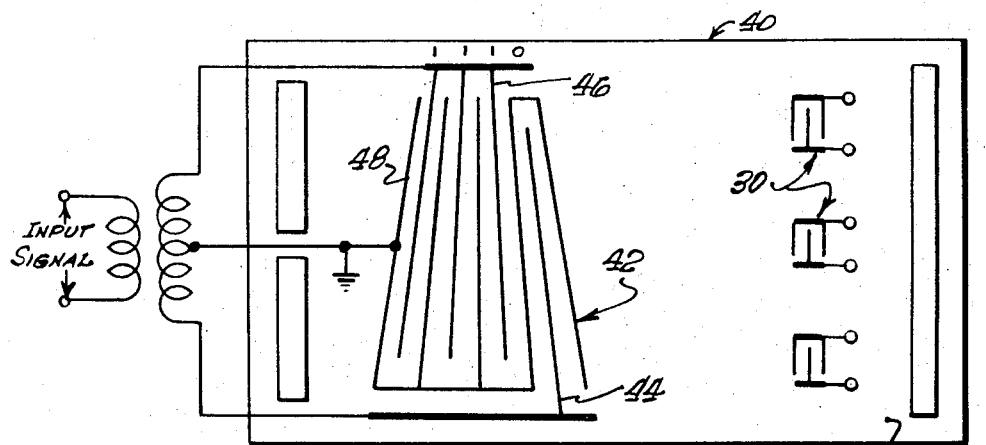
FIG. 2. CODED AMBIGUITY ANALYZER.
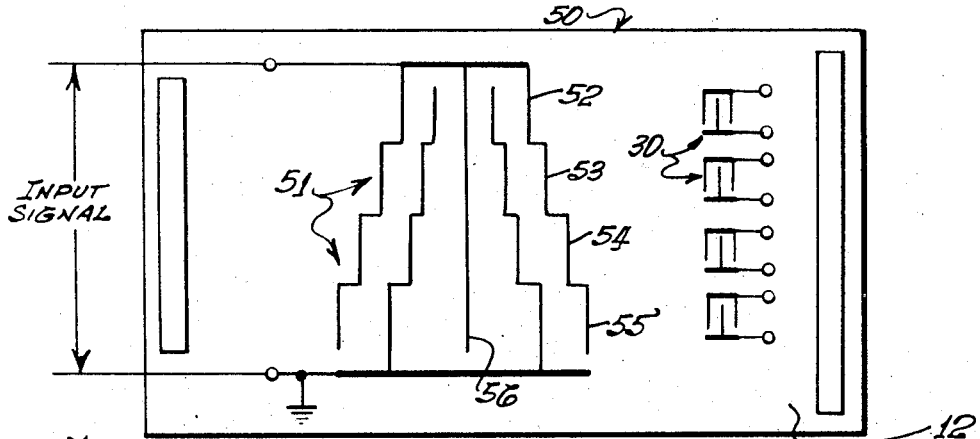
FIG. 3. DISCRETE UNCODED AMBIGUITY ANALYZER.
INVENTOR.
HARPER JOHN WHITEHOUSE,
BY  ERVIN F. JOHNSTON, ATTORNEY.
JOHN STAN, AGENT.

AMBIGUITY ANALYZER WITH TRANSMITTING TRANSDUCER HAVING CURVED ELECTRODES.

SURFACE WAVE AMBIGUITY ANALYZER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a surface wave device, preferably of the field-delineated type, capable of providing a simultaneous evaluation of analysis of exact wideband signal ambiguity, in compression and delay, by means of a single surface wave structure. A field-delineated transducer includes a third set of interdigitated, and interconnected, electrodes located between the interdigitations of the regular pair of electrodes, for controlling, or delineating, the field or direction of the acoustic surface wave produced by the transducer. The two-dimensional surface disturbance produced on the surface wave ambiguity analyzer corresponds to the true ambiguity surface of the signal and the electrode pattern, and this pattern, and therefore the ambiguity in the modified doppler signal, may be detected in various ways.

The ambiguity analyzer analyzes ambiguity by providing the ambiguity in a two-dimensional displacement of the surface of the crystal substrate.

Basically, wideband doppler ambiguity is analogous to narrow-band doppler ambiguity in the sense that in each of them one cannot simultaneously specify the range behavior and the doppler behavior. The details of the difference are: For narrow-band doppler, a frequency-shift of the carrier is used, whereas in wideband doppler an actual time expansion or contraction of one of the signal waveforms is used.

The range of doppler which may be detected, that is, the difference between the highest doppler frequency and the lowest doppler frequency, is determined, on the ambiguity analyzer, by the difference between the widths of the top and bottom parts of the transmitting transducer. Generally, the transmitting transducer would be so configured that the median, or reference, frequency would match the frequency as determined by the spacing of the electrodes, and the material of the substrate, at a median horizontal distance between the top and bottom bus-bars.

However, these frequencies cannot be observed directly. Rather they are observed in the autocorrelation function, which is the Fourier transform of the spectrum. So, what is actually observed are signals in the time domain rather than in the frequency domain.

There exists on the crystal a complete two-dimensional range-doppler distribution, to which may be applied well known readout techniques in order to be able to determine the required output.

A specific doppler may be determined in any of various prior art methods. A column of receiving transducers consisting of parallel electrodes may be placed at the receiving end, between the transmitting transducer and one of the absorbers, to pick up individual voltage trains, which are functions of the various dopplers present in the input train.

Instead of piezoelectric output transducers, optical reflectors, stationary or scanned, may be used. A light beam can be shined on the reflectors, with the reflected light received by an array of photodetectors, the amount of reflected light being a function of the doppler frequency. Frustrated internal reflection of light may be used.

A moving conductor may be used, with the complete ambiguity analyzer placed in a magnetic field. This also is a prior art method.

If either an array of electrical outputs or a two-dimensional output such as a scanning light beam or a scanning electron beam is used, a TV-like raster will be generated which is the true ambiguity function of the signal represented by the electrode structure or the cross ambiguity function of the signal and pattern if these are different functions.

For general information about the propagation of acoustic signals on surface wave devices, as well as theoretical information about spectral analysis by surface wave devices, using parallel-electrode transducers however, reference is directed to U.S. Pat. No. 3,548,306, by the same inventor, which issued on Dec. 15, 1970.

SUMMARY OF THE INVENTION

This invention relates to a surface wave device, having interdigitated electrodes, of the field-delineated type, capable of providing a simultaneous evaluation or analysis of exact wideband doppler ambiguity by means of a single surface wave structure. The doppler ambiguity refers to the ambiguity in determining both the amount of delay and the amount of doppler, or in the range and range rate.

A field-delineated transducer, used in the transmitting transducer, includes a third set of interdigitated electrodes, located between the interdigitations of the conventional pair of electrodes, for controlling, or delineating, the field or direction of the acoustic surface wave produced by the transducer.

In a very general sense, the ambiguity analyzer performs the simultaneous cross correlation of one parameter, the given input signal (electrical), with a second parameter, the time-scaled versions of a second signal determined by the reference signal electrodes.

a. If the input signal is one of the reference signals, the ambiguity analyzer computes the ambiguity function of that signal, the variables being delay and time scaling.

b. If the input signal is a superposition of delayed and time-scaled replicas of the reference function, it computes the radar or sonar mapping of the received echos. The variables are range and doppler or range rate.

c. If the input signal is a mismatched version of the reference function, intentionally introduced at transmission, then the mapping described may sometimes be achieved with better fidelity.

d. If the signal is general and the reference function a sinusoid, then the device acts as a spectrum analyzer.

OBJECTS OF THE INVENTION

An object of the invention is to provide a small, compact, surface wave device which can analyze input signals simultaneously for doppler and delay.

Another object of the invention is to provide a surface wave device which can determine the frequency or frequencies which comprise the input signal.

Still another object of the invention is to provide a surface wave device which, by using coded transducers, can analyze for doppler and delay while amplifying the signal traversing the substrate.

Other objects, advantages, and novel features of the invention will become apparent from the following detailed description of the invention, when considered in conjunction with the accompanying drawings wherein:

BRIEF DESCRIPTION OF THE DRAWINGS

FIG. 1 is a diagrammatic view of a surface wave ambiguity analyzer using a pair of sets of uncoded transducers for the transmitting transducer.

FIG. 2 is a diagrammatic view of a coded surface wave analyzer which includes a third set, a field-delineating set, of electrodes, for the transmitting transducer.

FIG. 3 is a diagrammatic view of an uncoded ambiguity analyzer wherein the individual electrodes of the transmitting transducer have a staircase configuration.

DESCRIPTION OF THE PREFERRED EMBODIMENTS

Figure 4:
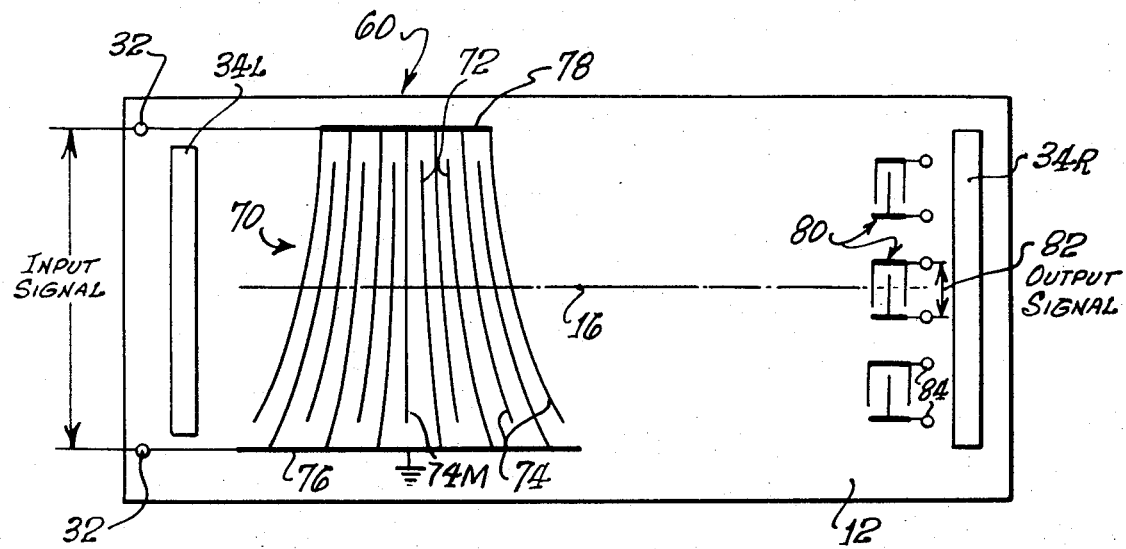
FIG. 4 is a diagrammatic view of an uncoded ambiguity analyzer having electrodes curved according to a set of regular functions.

Referring now to FIG. 1, this figure shows a surface-wave ambiguity analyzer 10 comprising a substrate 12, capable of propagating an acoustic surface wave on its surface, the direction of propagation indicated by double-headed arrow 14.

A transmitting electroacoustic transducer 20, disposed upon the substrate 12, has a perimeter substantially in the shape of a trapezoid, whose base 26 is parallel to the direction of surface wave propagation 14. The transmitting transducer 20 comprises a pair of sets of interdigitated electrodes, 22 and 24, the configuration of the electrodes conforming in shape to the graphs of a set of regular functions which do not cross or otherwise touch each other. In FIG. 1, the set of regular functions are linear functions.

A top bus bar 28 is parallel to the base of the trapezoid, to which one of the sets of electrodes 24 is connected, while a bottom bus bar 26 forms the base of the trapezoid, to which the other set of electrodes 22 of the pair of sets is connected. The top and bottom bus bars, 28 and 26, are connectable to an electrical signal source by means of input terminals 32.

Two absorbers, 34L and 34R, one on each end of the substrate 12, are disposed perpendicularly to the base 26 of the trapezoid, for absorbing unwanted acoustic relfections.

The ambiguity analyzer 10 may further comprise at least one acousto-electric receiving transducer 30, disposed at one end of the substrate 12 between the transmitting transducer 20 and one of the absorbers 34R, its electrodes being disposed perpendicularly to the direction of propagation of the acoustic wave, designated by double-headed arrow 14.

Only the transmitting transducer 20 need be disposed on the crystalline substrate 12, using the piezoelectric effect. The output may be obtained by other means than using a piezoelectric transducer also disposed on the substrate. Frustrated internal reflection, or piezoresistance may be used, or a moving wire if the output transducer is in a magnetic field. All of these methods are well known in the prior art.

Although FIG. 1 shows a transmitting transducer 20 whose outside electrodes, comprising the lateral sides of the trapezoid, are equal in length, this is not a required condition for it to be useful.

The input signal is that signal which would be obtainable if one would take the center out of the transmitting transducer 20 and used it to generate the signal, i.e., it is a coded signal whose code is that given by the polarity reversals and whose duration is that halfway through the transmitting transducer, at line 16.

The waves which are present at various horizontal levels on the ambiguity analyzer are not true sine waves, but rather are the result obtained by convolving the input signal with each particular horizontal slice of the transducer 20. They in turn are the cross-correlation at a particular doppler error. That is, at the top of the transducer 20, near top bus bar 28, the nominal signal correlated with a compressed version is obtained. At the center 16, a nominal signal correlated with itself is obtained. At the bottom of the surface wave analyzer, near the bus bar 26, a signal is obtained which results from the correlation with the expanded version of the signal.

In effect, generally the whole doppler spectrum may be covered. The ratio of the highest doppler frequency to the lowest doppler frequency covered is a function of the width of the top of the transmitting transducer 20 to the width of the bottom of the transmitting transducer.

The frequency that is transmitted by the trapezoidal transducer 20 is a narrow-band frequency compared to the bandwidth of any of the receiving transducers 30. If the receiving transducer 30 had a narrow-band response, the ambiguity function which is being measured may be distorted by the filtering action of the output transducer 20.

It is because of the comparatively great bandwidth of the single-fingered receiving transducers 30 that permits making all of them of the same electrode spacing, thus making them easier to fabricate. However, particularly for use as a spectrometer, it would be advantageous to make the spacing of the electrodes of each receiving transducer 30 the same as that of the corresponding horizontal section of the transmitting transducer, and this is shown in FIG. 4.

A single shielded finger is chosen for the receiving transducers 30 because this type of transducer has a very high bandwidth, so high that even if its finger spacing does not match that of the finger spacing of the corresponding horizontal section in the transmitting transducer 20, the receiving transducer will accomplish its purpose.

With respect to the dimensions of the interdigitations themselves, the width of each electrode, for example, electrodes 22 or 24, should be equal to the width of the space between two adjacent electrodes. For clarity of representation, in the various figures the electrodes are shown much thinner than this ratio. If one interdigitation is considered to consist of one "up" line and two "down" lines as in receiving transducers 30, the width of the interdigitation should be equal to one wavelength of the signal, where the wavelength and frequency when multiplied together equal the velocity of propagation of the wave on the material. Using quartz for the substrate material, the velocity is close to 3,000 meters per second. Thus, as an example, it may be seen that lines of 2 mils width with spaces between them of 2 mils will produce an operating frequency of the transducer of around 1.5 to 1.6 MegaHertz (MHz).

When the pair of sets of electrodes, 22 and 24, are uncoded, as shown in FIG. 1, then one set of electrodes acts as a shield for the other. However, when the electrodes are coded, this condition is no longer true, and a third, shielding, electrode must be introduced between the first pair of sets 22 and 24.

Accordingly, FIG. 2 shows a coded ambiguity analyzer 40 wherein the transmitting transducer 42 further comprises, besides the regular pair of electrodes 44 and 46, a third set of electrodes, a field-delineating, interconnected, set 48, disposed between the regular pair.

In FIG. 2 the output waveforms are not shown, but they would not generally be even approximately sinusoidal, inasmuch as the transmitting transducer 42 is coded. The specific shape of the output waveforms, of course, would depend on the specific coding of the transmitting transducer 42, the specific coding in this figure being 1 1 1 0.

The ratio of the finger spacing at the bottom of the trapezoid to the finger spacing at the top of the trapezoid could be as high as two to one for wideband ambiguity problems, but could be much less than this for specific applications, such as radar.

The two-headed arrow 14 indicates that a surface wave travels in both horizontal directions, to the left and to the right, toward the two absorbers, 34L and 34R. The acoustic wave going to the left is completely useless, and it is desirable that it be completely absorbed by left absorber 34L. The surface wave moving to the right is the useful wave, and it is desirable that all of it be intercepted by the receiving electrodes 30 rather than right absorber 34R. In the absence of the right absorber 34R, any surface wave which passed by the detecting means, such as the column of receiving transducers 30, would be reflected off the right edge of the substrate 12, and then travel in a leftward direction, to interfere with the oncoming surface wave traveling to the right.

The individual electrodes of each of the sets of electrodes of the transmitting transducer need not have a linear shape, as shown in FIGS. 1 and 2, but may have discrete offsets 52, 53, 54 and 55, in the form of a staircase function, as shown by the transmitting transducer 51 of the ambiguity analyzer 50 shown in FIG. 3. In this embodiment, there would generally be between 10 and 30 channels, with perhaps an upper limit of 100 channels, rather than only the four channels shown.

There would be one receiving transducer 30 for each offset in the transmitting transducer 51.

FIG. 4 shows yet another embodiment 60 of an ambiguity analyzer 70 wherein the pair of sets of electrodes 72 and 74 are curved, in this figure, quadratically and symmetrically about the center electrode 74M.

In a more general embodiment, the spacing need not be symmetric about a center electrode, for example, for processing chirps and similar signals.

In the embodiment shown in FIG. 4, the electrodes 74 are perpendicular to the bus bar 78 where they join it, and then curve away from the perpendicular as their distance from the bus bar increases, in a quadratic manner, for example, if desired. The exact curvature of electrodes 72 and 74 would depend on the range of frequencies expected in the input signal, for example, whether the input signal had acceleration components in it or not.

The embodiments shown in the various figures may be used for spectral analysis in the following manner. The wavelength and therefore frequency determined by a particular section of the transmitting transducer is a function of the spacing of the electrodes in that particular section, as well as the material of the substrate. The closer the spacing, the higher the frequency determined by these two parameters.

For improved operation as a spectrometer, the spacing of the output electrodes 80 at a specific horizontal distance from the base 76 of the transmitting transducer 70 should be the same as the spacing of the electrodes of the transmitting transducer at that same height. This type of configuration is shown in FIG. 4. Output signals 82 may be obtained at each of the output terminals 84, the magnitude of the signal at a particular output transducer 80 depending upon how closely the frequency determined by its electrode spacing matches the frequency of the input signal.

Obviously many modifications and variations of the present invention are possible in the light of the above teachings. It is therefore to be understood that within the scope of the appended claims the invention may be practiced otherwise than as specifically described.

What is claimed is:

1. A surface-wave ambiguity analyzer comprising:
   a substrate, capable of propagating an acoustic surface wave on its surface;
   a transmitting electroacoustic transducer, disposed upon the substrate, having a perimeter substantially in the shape of a trapezoid whose base is parallel to the direction of surface wave propagation, comprising:
      a pair of sets of interdigitated electrodes, the configuration of the electrodes conforming in shape to the graphs of a set of regular functions which do not cross or otherwise touch each other;
      a top bus bar, parallel to the base of the trapezoid, to which one of the sets of electrodes is connected;
      a bottom bus bar, forming the base of the trapezoid, to which the other set of electrodes of the pair of sets is connected;
      the top and bottom bus bars being connectable to an electrical signal source;
   two absorbers, one on each end of the substrate, disposed perpendic-ularly to the base of the trapezoid, for absorbing unwanted acoustic reflections and;
   at least two acoustic-electric receiving transducers, disposed at one end of the substrate between the transmitting transducer and one of the absorbers, whose electrodes are disposed perpendicularly to the direction of propagation of the acoustic wave.

2. The ambiguity analyzer according to claim 1, wherein the pair of sets of electrodes are uncoded.

3. The ambiguity analyzer according to claim 2, wherein the pair of sets of electrodes are coded.

4. The ambiguity analyzer according to claim 3, wherein the transmitting transducer further comprises
a third set of electrodes, a field-delineating, interconnected, set disposed between the pair of sets of electrodes, and conforming in shape to the same set of regular functions as the pair of sets of electrodes.

5. The ambiguity analyzer according to claim 4, wherein the set of regular functions are a set of linear functions.

6. The ambiguity analyzer according to claim 4, wherein the set of regular functions are a set of quadratic functions.

7. The ambiguity analyzer according to claim 4, wherein
the individual electrodes of each of the three sets of electrodes of the transmitting transducer have the shape of a staircase function.

8. The ambiguity analyzer according to claim 4, wherein
the two lateral sides of the trapezoid are equal.

9. The ambiguity analyzer according to claim 5, wherein
the two lateral sides of the trapezoid are equal.

* * * * *